United States Patent [19]

Thompson

[11] Patent Number: 5,161,563
[45] Date of Patent: Nov. 10, 1992

[54] FLUID FLOW CONTROL SYSTEM

[76] Inventor: Gary E. Thompson, P.O. Box 773222, Steamboat Springs, Colo. 80477

[21] Appl. No.: 775,341

[22] Filed: Oct. 15, 1991

[51] Int. Cl.$^5$ .............................................. E03B 7/04
[52] U.S. Cl. ........................................ 137/1; 137/486; 137/487.5; 137/883
[58] Field of Search ................ 137/486, 487.5, 1, 861, 137/883, 87

[56] References Cited

U.S. PATENT DOCUMENTS

| | | |
|---|---|---|
| 1,173,966 | 2/1916 | Hinkson . |
| 1,856,010 | 4/1934 | Diescher . |
| 2,012,351 | 8/1935 | Riney . |
| 2,160,766 | 5/1939 | Thomason . |
| 2,596,691 | 5/1952 | Jackson ............................ 137/486 |
| 3,506,033 | 4/1970 | Haney . |
| 3,800,827 | 4/1974 | Gonsior . |
| 4,180,088 | 12/1979 | Mallet . |
| 4,735,231 | 4/1988 | Jacquet . |

Primary Examiner—Alan Cohan
Attorney, Agent, or Firm—Brian D. Smith

[57] ABSTRACT

A system for controlling fluid flow between a first point and a second point on a fluid line is disclosed. The system includes the first valve located at the first point on the fluid line to permit forward fluid flow from the first point to the second point on the fluid line and for closing to prevent such forward fluid flow. The system also includes flow sensors for detecting forward fluid flow at the second point and opening the first valve when such forward fluid flow is detected. The flow sensors also close the first valve when fluid flow at the second point stops. The system further includes a second valve located at the second point for opening and closing to control forward fluid flow at the second point. The system prevents forward fluid flow if a break in the fluid line occurs between the first and second points by preventing the first valve from opening. The first valve is prevented from opening since forward fluid flow cannot occur at the second point when the second valve is opened if a depressurizing break in the fluid line has occurred.

9 Claims, 1 Drawing Sheet

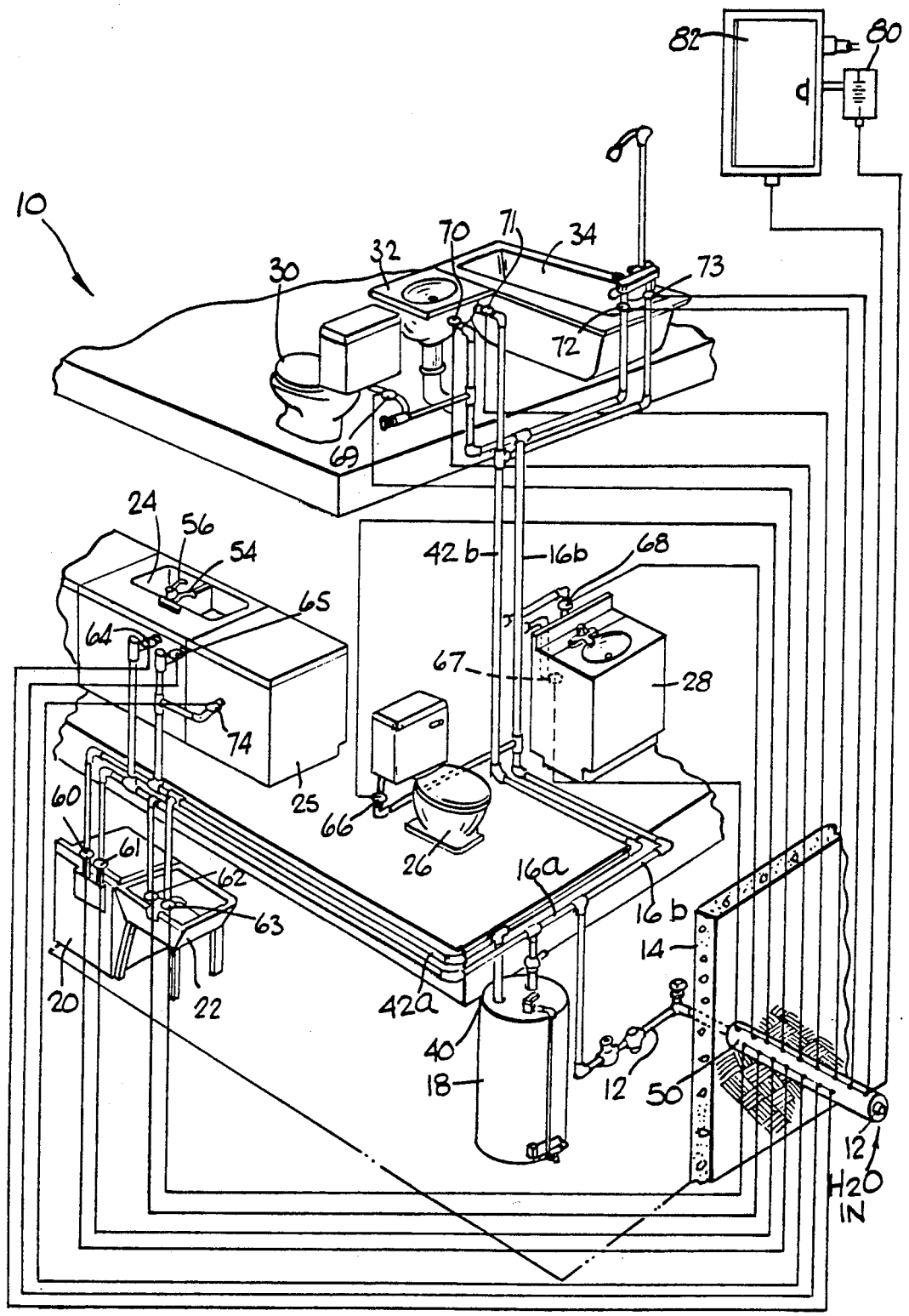

FLUID FLOW CONTROL SYSTEM

TECHNICAL FIELD OF THE INVENTION

The invention is generally directed to fluid flow control systems and, more particularly, to a system for preventing fluid flow, particularly water flow, whenever a break or leak in the system occurs.

BACKGROUND OF THE INVENTION

The damage caused by water leaking from a broken water line in a house or building can be extensive and typically exceeds several thousand dollars per household. Water destroys hardwood floors, carpeting, linoleum floors, etc. and can even cause a floor's foundation to warp. While the present inventor has no specific evidence as to how much water damage occurs in the United States alone each year, it is expected to run into the millions. Accordingly, a need exists for a system that will minimize the water damage which results when a break in a building's water line occurs.

U.S. Pat. No. 4,180,088 to Mallet addresses this problem with a water leak detection system which uses a water flow sensing device to shut off a valve on the incoming water line when water flow in the line is detected. The system can not be used during periods of normal water usage since the water flow which results, for example, when a simple faucet is turned on would activate the system and thereby shut off the supply of water. Accordingly, this system is only realistically usable when the homeowner intends to be away from home for an extended period of time or does not expect to use the system, for example at night. However, use of the system at night is not realistic either since most homeowners use bathroom facilities at night.

Other patents disclosing apparatus and systems for preventing or shutting off fluid flow are disclosed in U.S. Pat. Nos. 4,735,231; 3,506,033; 2,160,766; 2,012,351; 3,800,827; 1,173,966; and 1,956,010.

While all the aforementioned patents disclose systems for preventing fluid flow in one situation or another, a need still exists for a system which is capable of minimizing the leakage of water into a home or building at all times, i.e. is always on or and does not have to be switched on by the homeowner or building supervisor.

DISCLOSURE OF THE INVENTION

The present invention addresses the aforementioned problems by providing a fluid flow supply system that minimizes fluid leakage whenever a leak in a fluid line occurs. In its broadest sense, the system controls fluid flow between a first point and a second point on a fluid line. The system includes a first valve located at the first point on the fluid line for opening to permit fluid flow in a direction from the first point to the second point on the fluid line and for closing to prevent such fluid flow. This direction of fluid flow is referred to herein as "forward" fluid flow. The system also includes fluid flow sensing and control means for detecting fluid flowing in the forward direction at the second point and for opening the first valve when such flow is detected. The fluid flow sensing and control means also closes the first valve when forward fluid flow at the second point stops. In addition, the system includes a second valve such as a faucet located at the second point for opening and closing to control forward fluid flow at the second point.

The system prevents forward fluid flow, thereby minimizing water damage, by preventing the first valve from opening if a system depressurizing leak or break occurs in the fluid line between the first and second points. The first valve is prevented from opening by the fluid flow sensing and control means which will not open the first valve since forward fluid flow cannot occur and thus cannot be sensed at the second point when the second valve is opened if a depressurizing leak is present in the system. Depressurization of the system prevents forward fluid flow at the second point or for that matter anywhere in the system since fluid will not flow (i.e. flow uphill) unless it is under pressure.

On the other hand, if there is no leak in the system and the system remains pressurized, forward fluid flow will occur at the second point when the second valve is opened. This flow will be detected by the fluid flow sensing and control means which will open the first valve, thereby permitting fluid to flow into the system and continue flowing at the second point since the second valve is also open. When the second valve is closed, flow at the second point will stop, the stopping of which will be detected by the fluid flow sensing and control means which will close the first valve, thereby preventing fluid from flowing into the system. The system will remain pressurized when the second valve is closed unless, of course, a leak in the system occurs.

In a preferred embodiment of the present invention, the first valve located at the first point on the fluid line includes a normally closed, electrically controlled valve which opens to permit forward fluid flow when it is energized and which closes when deenergized to prevent forward fluid flow. The fluid flow sensing and control means detects forward fluid flow at the second point and energizes the electrically controlled valve when such flow is detected. In addition, the fluid flow sensing and control means deenergizes the electrically controlled valve when forward fluid flow at the second point drops below a predetermined rate.

The present invention also provides a method for controlling fluid flow between a first and second point on a fluid line. The method includes detecting forward fluid flow at the second point and permitting forward fluid flow at the first point when forward fluid flow at the second point is detected. The method further includes preventing forward fluid flow at the first point when forward fluid flow at the second point stops. If a system depressurizing leak occurs between the first and second points, the method of the present invention prevents flow at the first point since fluid flow cannot occur and thus cannot be detected at the second point when such a leak occurs. On the other hand, if forward fluid flow occurs at the second point, the method of the present invention will permit fluid flow at the first point, thereby permitting fluid to enter and flow through the system.

BRIEF DESCRIPTION OF THE DRAWINGS

Other features of this invention will appear in the following description and appended claims, reference being made to the accompanying drawings forming a part of the specification where like referenced characters designate corresponding parts in the views.

The sole figure is a schematic perspective view of an embodiment of the present invention.

DETAILED DESCRIPTION OF A PREFERRED EMBODIMENT

The sole figure illustrates a fluid flow control system 10 of the present invention installed on a water supply system which is similar to that found in many homes today. The water supply system has an incoming water line 12 which receives water from a source (not numbered) which is typically pressurized. The incoming water line 12 passes through a basement wall 14 of the house to supply water to two branches 16a and 16b of the house's cold water supply line. As illustrated, branch 16a supplies cold water to the building's hot water heater 18, a washing machine 20 located in the basement of the building and a washing basin 22 also located in the basement of the building. In addition, branch 16a supplies cold water to the kitchen sink 24. Similarly, cold water branch 16b supplies cold water to a main floor toilet 26, a main floor bathroom sink 28, an upstairs toilet 30, upstairs sink 32 and upstairs tub/shower 34.

The building's hot water which is heated by hot water heater 18 exits heater 18 through a water line 40 which supplies hot water to two hot water line branches 42a and 42b. Branch 42a supplies hot water to washing machine 20, sink 22, kitchen sink 24 and dishwasher 25. Branch 42b supplies hot water to sink 28, upstairs sink 32 and tub/shower unit 34.

The system described thus far is quite conventional in that it is commonly found in today's buildings and homes. The present invention which can easily be installed on such a system includes an electrically controlled valve 50, preferably a solenoid valve, which is installed on the incoming water line 12, preferably on the exterior side of the house's basement wall 14. Solenoid valve 50 is buried below the soil's surface at a depth which prevents the valve from freezing which depth, of course, will vary from region to region. Solenoid valve 50 is also of the type which is normally closed, thereby preventing water flow into the house unless it is energized to open.

In accordance with an important aspect of the present invention, solenoid valve 50 remains closed (and thus is not energized) until forward fluid flow is sensed by one or more of a plurality of flow sensors 60-74, one of which is located on each hot and cold water line supplying each water utilization device in the house with water i.e. each sink, dishwasher, tub, etc. Quite obviously, water flow at a water utilization device cannot be sensed if the device is not using water i.e. if the flow of water to the device is shut off. For example, water will not flow through a water utilization device such as faucet 54 of kitchen sink 24 until its control arm 56 which controls hot and cold water flow through the faucet is turned on. When, however, arm 56 is turned on to a position allowing hot water flow, flow sensor 65 (which is installed on the hot water line supplying faucet 54) will sense the flow of hot water to the faucet. The flow sensed by sensor 65 causes the sensor which acts like a switch to complete (or close) an electrical circuit with the solenoid valve, thereby energizing and opening the valve. As such, water flows into the system replenishing that which has left through faucet 54. Valve 50 will remain open as long as flow sensor 65 senses the flow of water which will continue until faucet 54 is shut off.

If a water line should break or begin leaking anywhere between solenoid valve 50 and the valve of any water utilizing device in the system, solenoid valve 50 remains closed, thereby preventing water from entering the system and causing damage. Valve 50 remains closed because water flow cannot be sensed by any of the flow sensors in the system when a break or leaks occurs. Water flow cannot be sensed because it cannot occur when a leak occurs and it cannot occur because the system depressurizes when such a break or leak occurs i.e. if the break is of any appreciable nature.

If there is no leak in the system, water in the system will normally be pressurized. When a water utilizing device is turned on, the pressure causes water to flow through the device. This flow is sensed by the device's respective flow sensor which, as previously described, energizes the solenoid valve, thereby opening valve 50 which permits outside water to flow into the system and replenish that which is leaving the system through the water utilization device.

It will be appreciated that the flow sensors of the present invention only detect fluid flowing towards a water utilization device which is referred to herein as forward fluid flow. The flow sensors should not detect backwards flow (i.e. flow towards the solenoid valve which is the type of water flow which would occur if a break in the system occurred). If backward flow were detectable, the solenoid valve would be energized and open whenever a leak is detected. This is clearly undesirable since the incoming water would simply feed the existing leak or break in the system which could cause extensive damage which is what the present invention is intended to prevent in the first place. Accordingly, it is important that the flow sensors of the present invention only have the capability of detecting forward fluid flow (or at least be capable of distinguishing between forward and backward flow).

The flow sensors of the present invention should also be capable of detecting forward fluid flow at low flow rates. This capability is necessary so that the solenoid valve will open when water is being used at a low rate. If the system were not capable of detecting low flow rates the system would depressurize when water or fluid is drawn from the system at low flow rates. If this were to occur, the entire system would cease functioning since water cannot flow and thus cannot be detected to open the solenoid valve when the system depressurizes (even if a faucet, for example, is turned on full). Accordingly, the flow sensors used on any system in accordance with the present invention should be capable of detecting extremely low (and forward) flow rates, preferably on the order of 0.1 gallons per minute.

A flow sensor which is capable of detecting low flow rates and which has provided good results in a system which was used to verify the principles of the present invention is the Model PSR-5115 which is a paddle-type flow switch available from Kobold, Inc. of Pittsburgh, Pennsylvania. A solenoid valve which was found to provide good results in controlling water flow on the incoming water line of the test system is the model 09-620-32.0200 which is available from Herion, Inc. of Warrendale, Pennsylvania.

While not mentioned previously, it is important that the flow sensors be located as close as possible to the water flow control valves of the water utilization devices. In fact, the flow sensors would ideally be located in the water utilization devices and could be possibly be part of the water utilization devices. It is important to keep the flow sensors as close as possible to the water utilization devices' valves so that any breaks or leaks in the system occur upstream from a flow sensor. It will be appreciated that a downstream leak or break in the system might, if significant enough, cause "forward" fluid flow which would be detected by a flow sensor and open the solenoid valve. The opening of the solenoid valve would clearly be undesirable in this situation since it would simply feed water to the leak.

It is also desirable to have a back up battery 80 connected to the system (i.e., the home's fuse box or circuit breaker 82) which can power the system if power to breaker 82 is interrupted.

As used in the claims appended hereto, "first valve" includes any valve such as solenoid valve 50 which is controlled to open and close and thereby permit and prevent the flow of water into the system from a pressurized fluid source. The term "second valve" as used in the claims appended hereto includes any valve on a water utilizing device such as that used in faucet 54 which is opened and closed to permit and prevent fluid flow into or through the water utilizing device. "Fluid flow sensing and control means" as used in the claims appended hereto includes any device for detecting fluid flow such as flow sensors 60 through 74 and any means, electrical or otherwise, which cooperates with the flow sensors to open and close the first valve.

While the above invention has been shown and described in detail in this application, it should be understood that this invention is not to be limited to the exact form disclosed and changes in detail and construction of the invention may be made without departing from the spirit thereof.

What is claimed:

1. A system for controlling the flow of fluid from a pressurized source of fluid comprising:
    a main fluid supply line in fluid communication with a pressurized source of fluid;
    a plurality of plumbing fixtures, each of which is provided with a fluid flow control valve for controlling fluid flow;
    a plurality of branch fluid supply lines in fluid communication with said main supply line and said plumbing fixtures;
    a main shut off valve located on said main supply line;
    a fluid flow sensor located at each fixture at or upstream of the flow control valve for each respective fixture;
    control means for sensing flow at any of said flow sensors to open said main shut off valve when any of said fixtures' valves is opened, and to close and maintain said main shut off valve closed when flow is not sensed at any fixture.

2. A system as claimed in claim 1 wherein said main shut off valve is an electrically controlled solenoid valve.

3. A system as claimed in claim 1 wherein one of said fixtures is a faucet.

4. A system as claimed in claim 1 wherein one of said fixtures is a dishwasher.

5. A system as claimed in claim 1 wherein one of said fixtures is a washing machine.

6. A system as claimed in claim 1 wherein one of said fixtures is a toilet.

7. A system as claimed in claim 1 wherein said flow sensors are capable of detecting flow as low as 0.1 gallons per minute.

8. A system as claimed in claim 3 wherein fluid flow is considered to have stopped at a fixture when fluid flow is less than 0.1 gallons per minute.

9. A method for controlling the flow of fluid from a pressurized source of fluid comprising the steps of:
    providing a system for controlling the flow of fluid from a pressurized source of fluid, including:
        a main fluid supply line in fluid communication with a pressurized source of fluid;
        a plurality of plumbing fixtures, each of which is provided with a fluid flow control valve for controlling fluid flow;
        a plurality of branch fluid supply lines in fluid communication with the main supply line and the plumbing fixtures;
        a main shut off valve located on the main supply line;
        a fluid flow sensor located at each fixture at or upstream of the flow control valve for each respective fixture;
        control means for sensing flow at any of the flow sensors to open the main shut off valve when any of the fixtures' valves is opened, and to close and maintain the main shut off valve closed when flow is not sensed at any fixture;
    opening the valve of a fixture so that fluid begins to flow therethrough;
    sensing the forward fluid flow when occurs at the fixture whose valve has been opened;
    opening the main shut off valve to permit fluid flow through the main fluid supply line when forward fluid flow at a fixture is sensed; and
    closing the main shut off valve to prevent forward fluid flow in the main fluid supply line when forward fluid flow is not sensed at any fixture.

* * * * *